(12) United States Patent
Moyer (10) Patent No.: US 8,753,457 B2
(45) Date of Patent: *Jun. 17, 2014

(54) NITROGEN ALLOYED MARTENSITIC STAINLESS STEEL AND PROCESS

(76) Inventor: Kenneth A. Moyer, Cinnaminson, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/471,518

(22) Filed: May 15, 2012

(65) Prior Publication Data

US 2013/0126048 A1 May 23, 2013

Related U.S. Application Data

(62) Division of application No. 12/951,355, filed on Nov. 22, 2010, now Pat. No. 8,182,617.

(60) Provisional application No. 61/389,503, filed on Oct. 4, 2010.

(51) Int. Cl.
*C23C 8/26* (2006.01)

(52) U.S. Cl.
USPC ............................ 148/230; 148/223; 148/318

(58) Field of Classification Search
USPC ........................................ 148/230, 223, 318
See application file for complete search history.

(56) References Cited

U.S. PATENT DOCUMENTS 8,182,617 B2 * 5/2012 Moyer .......................... 148/230

* cited by examiner

*Primary Examiner* — Jessee Roe
(74) *Attorney, Agent, or Firm* — Craig M. Bell (57) ABSTRACT

The present invention comprises a process for nitriding martensitic stainless steel and the alloy produced thereby comprising heating a stainless steel alloy to a temperature of from about 900° F. (480° C.) to about 2500° F. (1370° C.) in a vacuum furnace in the presence of hydrogen or argon gas in order to clean the surface. After the hydrogen or argon gas is removed from the chamber, nitrogen gas, or a different nitrogen gas derivative is injected into said furnace as a pulsed injection at a partial pressure of from about 500 torr to about 1000 torr. The steel is nitrogen alloyed at a temperature of from about 1400° F. (760° C.) to about 2200° F. (1205° C.) and then quickly quenched at ambient temperature. Preferably, after a sufficient period of time, the temperature is raised a second time from about 900° F. (480° C.) to about 2500° F. (1370° C.) prior to cooling the final product.

12 Claims, 4 Drawing Sheets

Figure 1A

422 Stainless Steel Nitrided 10 Hours

Surface

Figure 1B

Core

Figure 3

NITROGEN ALLOYED MARTENSITIC STAINLESS STEEL AND PROCESS

CROSS-REFERENCE TO RELATED APPLICATIONS

This application is a divisional of U.S. Ser. No. 12/951,355 filed on Nov. 22, 2010 now U.S. Pat. No. 8,182,167 which claims the benefit of priority of U.S. Provisional Appln. No. 61/389,503 filed on Oct. 4, 2010.

This invention was made with United States government support under Naval Air (NAVAIR) Contract No. N88335-190-C-0141 and the U.S. government may have some rights herein.

FIELD OF THE INVENTION

The present invention relates generally to industrial coatings used in the protection of metal surfaces and methods for the application of said coatings onto said metal surface. More specifically, the present invention relates to the hardening of wrought iron-based steel surfaces for improved wear-resistance and protection thereof against the weather and other external environmental elements.

BACKGROUND OF THE INVENTION

High performance jet aircraft have landing struts and tailhooks that are constantly subjected to high temperatures, pressures, friction and stress. In another industry, spray paint applicators utilize high pressure pumps to distribute sprayed paint under an atomizing pressure of 3,000 psi. or more. One of the main constituents of the pump is a piston rod which under pressure, forceably ejects the paint and sprays it from the nozzle of the applicator. In practice, the piston rod is protected from erosion by seals that prevent the hard, abrasive particles comprising the paint pigments from abrading and degrading the piston rod. However, when the spray paint applicator needs service, the seals begin to leak and thereby permit pigment to abrade the piston rod. Therefore, the piston rod also requires a considerable degree of surface protection against abrasion, while not compromising the corrosion resistance of the piston rod.

Alloys are commercially available that provide sufficient abrasion resistance for the protection of the surface of the piston rod, aircraft struts and hooks. Two examples of these are martensitic stainless steels denoted as 440 C and 422 XD. These materials have the properties of good strength, ductility and toughness, required of piston rods. In addition, the alloys provide excellent corrosion resistance against the liquid carrier vehicle of the paint being transported to the nozzle.

Corrosion protection of high performance steels without sacrificing their mechanical and tribological properties is critical for advanced applications such as defense vehicles and aircraft. Current materials for bearings and gears for example, have insufficient corrosion resistance to satisfy modern Navy and Air Force requirements, and require corrosion inhibiting oils for corrosion resistance. Although the currently available steels are therefore able to provide corrosion protection, the oil formulations reduce boundary lubrication performance. The reduction in wear resistance, in turn, limits operating power required for improved aero propulsion engine and gear box systems. Advanced bearing steels provide adequate wear resistance, but lack corrosion resistance. High nitrogen martensitic stainless steels have improved corrosion resistance, and also exhibit good contact fatigue resistance. However, these steels are limited in abrasive and adhesive wear resistance and are subject to high speed and high temperature scuffing. The problem is that the protective chromium oxide film on these steels limits boundary lubricating film formation. Rather than chromium, iron or iron oxide is required to react with the oil additives. In addition, the high nitrogen martensitic stainless steels do not have the shear stability necessary to resist adhesive wear or scuffing.

Nitriding involves the diffusion of nitrogen into the surface of certain steels to form compounds. In doing so, it expands the steel lattice structure, stressing the atomic bonds. The stress causes the surface to be in compression, thereby hardening the surface and improving the fatigue strength. Fatigue occurs when a cycle of tension followed by compression continues for many cycles.

In the gas nitriding of stainless steel, the donor is a nitrogen-rich gas such as ammonia ($NH_3$), and is often referred to in the art as ammonia nitriding. When ammonia comes into contact with the heated work piece, it disassociates into nitrogen and hydrogen. The nitrogen concentrated on the surface then diffuses from the surface to the interior, depending upon concentration and time. This aspect of the process is well known in the art. The present invention however, comprises a process that can be accurately controlled. The thickness and phase constitution of the resulting nitriding layers can be selected and the process optimized for the particular stainless steel properties required. The advantages of gas nitriding over the other variants are:

The process results in a homogeneous deposition of nitrogen on the surface.

The preparation of large batch sizes is possible—the limiting factor being furnace size and gas flow With modern computer control of the atmosphere, the nitriding results can be tightly controlled Relatively cheap equipment cost—especially compared with plasma nitriding The disadvantages of the gas nitriding processes known in the art are:

Reaction kinetics are heavily influenced by the stainless steel surface condition. An oily stainless steel surface or one contaminated with cutting fluids will adversely affect the process and result in a poor product.

Surface activation is sometimes required to successfully treat steels with a highly concentrated ammonia as the nitriding medium. Secondly, although not especially toxic, ammonia can be harmful when inhaled in large quantities. Also, care must be taken when heating in the presence of oxygen to reduce the risk of explosion The present invention comprises a nitrogen alloyed martensitic stainless steel with a surface treatment that affords superior performance above and beyond that of current nitrided martensitic stainless steels. The nitrogen alloyed stainless steels possess improved wear resistance, especially to adhesive wear and scuffing, without the sacrifice of corrosion resistance inherent in martensitic stainless steels. These advantages are achieved through the alloying of the stainless steel alloys with nitrogen. The present invention improves corrosion resistance and enhances adhesion and scuffing resistance. In addition, a nitriding or carburizing cycle was designed to further protect the surface from adhesive wear and to resist scuffing. Thus, the nitrided wrought iron-based stainless steel alloys of the present invention have particular applications in the manufacture and assembly of Naval and Air Force aircraft tail hook catch mechanisms, struts and landing gear.

SUMMARY OF THE INVENTION

The present invention comprises the nitrogen alloying of martensitic stainless steel with a gaseous nitrogen compound such as nitrogen gas ($N_2$), or ammonia ($NH_3$) at higher temperatures than practiced today to improve the kinetics of the diffusion process without causing appreciable grain growth. A martensitic stainless steel is reacted with nitrogen or ammonia gas at various pressures to provide a nitrogen alloyed steel.

DETAILED DESCRIPTION OF THE INVENTION

As opposed to the process disclosed and claimed in the related parent patent application U.S. Ser. No. 12/951,355, the present invention comprises the nitrogen alloying of martensitic stainless steel with nitrogen ($N_2$), or ammonia gas ($NH_3$) at temperature higher than conventionally practiced wherein the deposition concentration of nitrogen is significantly increased and diffusion thereof is significantly enhanced.

Generally, the present invention is a process for nitriding martensitic stainless steel comprising heating stainless steel to a temperature of from about 900° F. (480° C.) to about 2500° F. (1370° C.) in a vacuum furnace in the presence of hydrogen or argon gas in order to clean the stainless steel surface thereof. The hydrogen or argon gas is then removed and replaced by the injection of nitrogen or ammonia gas into the furnace as a pulsed injection whereby the furnace pressure is maintained at a partial pressure of from about 500 torr to about 1000 torr. The steel part is thereby nitrided at a temperature of from about 1400° F. (760° C.) to about 2200° F. (1205° C.) followed by rapidly quenching said stainless steel at ambient temperature.

The nitrided stainless steel billets are then immersed into a nitrogen chamber and the temperature lowered to −184° F. (−80° C.) for 30 minutes and then further lowered to −300° F. (−184° C.) and maintained at temperature for 30 minutes to stabilize the microstructure thus formed. The stabilized structure is then tempered to a specific hardness.

The secondary-hardening nitride formation will occur as fine precipitates in the martensite. The degree to which the change will occur will be dependent on:

The hardness required (after tempering)
The amount of nitride-forming elements present in the steel analysis
The tempering temperature selected
The time at the tempering temperature
The number of tempering procedures given to the steel (generally at least two to three tempers)
The higher the selected final tempering temperature of the steel might be, the coarser the formed nitrides will be.

It is well known that quench hardening is a process in which steel and cast iron alloys are strengthened and hardened. The material is heated to a certain temperature above the austenite/ferrite transition temperature, depending upon alloy composition, and then rapidly cooled which transforms the austenite to martensite. The material is then tempered to reduce the brittleness inherent in un-tempered martensite that occurs. Items that may be quenched include gears, shafts, and wear blocks.

The next step in the process is quenching of the stainless steel part. Water is one of the most efficient quenching media wherein maximum hardness is acquired, but there is a chance that it may cause distortion and cracking in highly alloyed steels. In the art, when hardness can be sacrificed, whale, cottonseed and mineral oils are used. These often tend to oxidize and form a sludge, which consequently lowers the efficiency. The quenching velocity (cooling rate) of oil is much less than water. Intermediate rates between water and oil can be obtained with additives to increase the transfer of heat from the surface of the part. To minimize distortion, long cylindrical workpieces are quenched vertically; flat workpieces are quenched on edge; and thick sections should enter the bath first. In order to prevent vapor formation on the surface, the bath is agitated.

Using the process of the present invention, a concentration in the order of 1.8 m/o (mass %) nitrogen is deposited on the surface of the martensitic stainless steel. Use of higher diffusion temperatures provides a greater depth of nitriding at reduced times. At this point, the steel is in an un-stabilized condition and there may be extensive retained austenite, which would transform to un-tempered martensite. Therefore, the 10 barr quenched stainless steels are immersed into a nitrogen chamber and the temperature is lowered to −184° F. (−80° C.) for 30 minutes. The temperature is then further lowered to −300° F. (−184° C.) and maintained at this temperature for 30 minutes to stabilize the microstructure. A final tempering treatment in a vacuum furnace at 950° F. (510° C.) for up to four hours completes the thermal cycle.

The process is dependent on the two fundamental equations of state. These include Fick's second law: $D=k\sqrt{t}$. This equation defines the nitrided depth, and is a function of the temperature selected for nitriding and the total time for diffusion to result. The total time for diffusion is regulated by multiple boost and diffusion cycles. The second equation of importance is the ratio of the time permitted for the deposition of atomic nitrogen deposited on the surface to diffuse ($t_d$) to the time allotted for deposition of the atomic nitrogen on the surface ($t_b$): $R=t_d/t_b$.

After the required number of boost-diffusion cycles to achieve the desired depth of nitrogen diffusion, the alloy is quenched rapidly to transform to martensite. The quenched alloy is further stabilized in a nitrogen bath at sub-zero temperatures to transform any retained un-stable austenite present to martensite. The alloy, after stabilization, can be tempered to provide core properties that are typical of the alloy. Due to the higher deposition temperatures, shorter diffusion times are possible for the formation of the nitrides, resulting in the ability to obtain either the desired reacted depth of hardness in significantly shorter time, or total nitrogen alloying, which overall results in reduced energy costs and pollution for a greater conservation of the environment.

The present inventive process for nitriding martensitic stainless steels comprises heating wrought iron martensitic stainless steel to a temperature of from about 900° F. (480° C.) to about 2500° F. (1370° C.) in a vacuum furnace in the presence of hydrogen or argon gas in order to clean the surface. The hydrogen or argon gas is then removed and the furnace chamber vacated followed by the injection of nitrogen ($N_2$) gas, ammonia gas ($NH_3$) or other nitrogen gas derivative(s) into said furnace as a pulsed injection at a partial pressure of from about 500 torr to about 1000 torr. The wrought iron steel is then nitrated at a temperature of from about 1400° F. (760° C.) to about 2200° F. (1205° C.). The steel is then quenched (cooled) for a sufficient period of time and the temperature then raised a second time from about 900° F. (480° C.) to about 2500° F. (1370° C.) prior to cooling the final product. The wrought martensitic stainless steel may be further stabilized in a nitrogen bath at sub-zero temperatures to insure any remaining austenite is transformed into un-tempered martensite.

Consequently, the process of the present invention also consists of nitrogen alloyed martensitic stainless steel that has a concentration in the order of about 1.8 m/o (mass %) nitrogen deposited on its surface. The nitrided surface is formed from 2.0 to about 4.0 mm deep with a minimum surface hardness of >58 HRC.

Without being bound to any theory, it is believed that the atomic nitrogen is rapidly diffused to combine with mobile nitride formers inherent within the steel to form primary nitrides or other intermediate metallic compounds. The degree of nitride formation depends on the diffusion time, partial pressure and temperature as established above. It is believed that during this cycle, the nitride formers contained within the alloy composition are mobile and also diffuse to result in equilibrium, depending on the available supply of nitrogen.

The process of the present invention further envisions the use of any nitrogen gas forming composition that may be introduced into a vacuum furnace thereby creating a nitrogen supply or source at partial pressure. This results in the deposition of the concentration of nitrogen atoms on the surface of the active designated alloy that contains nitride formers within, such as, for example, chromium, molybdenum, etc. The nitrogen source is introduced to the furnace atmosphere as a gaseous mixture at a pre-determined partial pressure for a specific time period to enable the nitrogen to deposit onto the surface and react with nitride formers contained within the stainless steel adjacent to the surface, to form nitrides. In a parallel theory, incorporating the nitrogen into the stainless steel during the diffusion cycle, the nitrogen diffuses from the surface to the interior of the alloy and the alloy nitride formers migrate to the abundant nitrogen supply at the surface to react to form stable nitrides and martensite.

In order to improve the hardening of martensitic stainless steel surfaces for improved wear-resistance and corrosion protection for high performance jet aircraft that have landing struts and tail-hooks that are constantly subjected to high temperatures, pressures, friction and stress, the nitriding process of the present invention was developed in order to provide at a minimum a required surface hardness of >58 HRC on a ⅝ inch thick 422 stainless steel bushing. The process consisted of heat treating various thicknesses of 422 stainless steel bushings to 1900° F. (1040° C.) in a partial pressure of nitrogen for one to eleven hours, quenching in a 10 bar furnace, followed by nitrogen stabilization and a two-hour 200° F. (95° C.) temper (quench). This cycle provided a required nitrided depth of 1 mm of hardness greater than 58 HRC.

Another embodiment of the present invention includes an additional nitriding cycle whereby the nitrogen alloyed steel part is maintained in a protective atmosphere, such as hydrogen or argon and elevated to the reaction temperature to produce an active surface. This cleansing gas is then evacuated and nitrogen or derivative gas is introduced to permit a specific concentration of nitrogen upon the surface of the part.

The nitriding process of the present invention can produce a nitrided surface 2 mm deep in less than 10 hours as compared with current nitriding processes that require more than 24 hours to produce a nitrided surface of 1.0 mm. Deposition of nitrogen on the surface is at a higher concentration of greater than 0.1 m/o nitrogen, because nitrogen solubility in austenite increases as the temperature increases. Diffusion of nitrogen deposited on the surface is more rapid because the diffusion rate is faster at higher nitriding temperatures.

The process also comprises a treatment step at sub-zero temperatures to stabilize the martensite by eliminating retained austenite. Once the alloy has been stabilized, the core is then tempered to a required hardness. The immediate surface of the steel is chromium/nitride rich and the amounts and kinds of nitrides decrease from the surface strata inward to the core. In contrast, the martensite formation is least at the surface, because the chromium nitride formation predominates.

The following examples are provided to more specifically set forth and define the process of the present invention. It is recognized that changes may be made to the specific parameters and ranges disclosed herein and that there are a number of different ways known in the art to change the disclosed variables. And whereas it is understood that only the preferred embodiments of these elements are disclosed herein as set forth in the specification and drawings, the invention should not be so limited and should be construed in terms of the spirit and scope of the claims that follow herein.

Example I

A martensitic stainless steel bushing was placed in a partial pressure vacuum furnace, which was then evacuated to about −100µ pressure. Hydrogen gas was introduced and the temperature was elevated to 1000° F. (540° C.) to activate the surface. A partial pressure of nitrogen gas was introduced and the temperature was elevated to 2000° F. (1095° C.). The nitrogen gas flow was increased to 630 torr and the bushing was nitrided under these conditions for a total of 10 hours. The bushing was quenched in nitrogen at 10 barr pressure to ambient in 53 seconds. The bushing was then stabilized in liquid nitrogen at −300° F. for 30 minutes and tempered in air for 2 hours.

The stainless steel bushing nitrided under the above conditions was sectioned to permit micro-hardness readings from the surface to a depth of 1 mm. at 0.1 mm intervals. Subsequent hardness measurements were continued to measure the hardness over the total cross section. To accomplish this, the cross section was mounted in Bakelite, ground and polished. A load of 1 kg force was employed to make the required indentations for measurement. Prior to testing, a standard test block was tested to determine the bias of the test method. Traverses were made throughout the total cross section of the bushings.

Small cubes were also cut from the nitrided bushing and analyzed for nitrogen content, using a Leco determinator. The measured nitrogen content was 0.14 m/o. Again, standard test specimens are evaluated to determine the bias of the test measurements. The results of the evaluation are included within Table I.

Hardness traverses were made at the surface of the nitrided bushing. The hardness measurements indicate that we have satisfied the requirement of a minimum nitrided surface of 58 HRC for a distance of 1 mm. However, in continuing the measurements we discovered that the total cross section had a minimum hardness of 55 HRC.

Figure 1A:
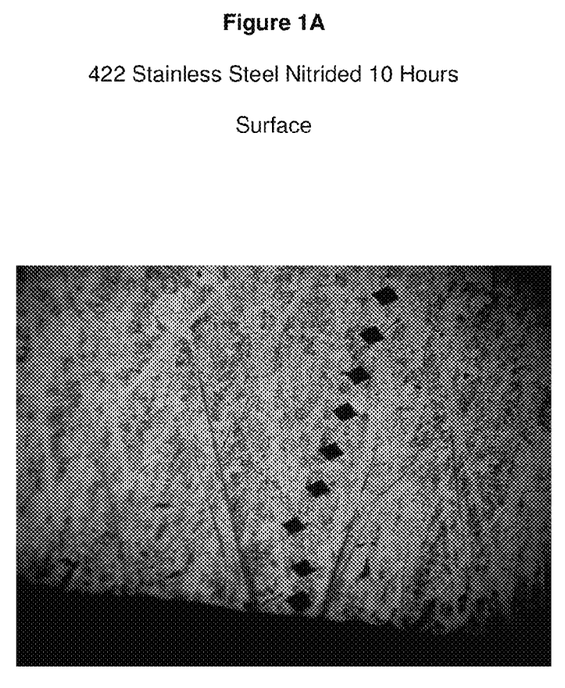
FIG. 1A is a micrograph showing the nitrided surface of a nitrogen alloyed 422 martensitic stainless steel prepared according to example 1.

FIG. 1A shows a micrograph of the surface of a 422 martensitic stainless steel bushing that was nitrided at 2000° F. for 10 hours. The microstructure consists of tempered martensite, with no evidence of retained austenite being present.

Figure 1B:
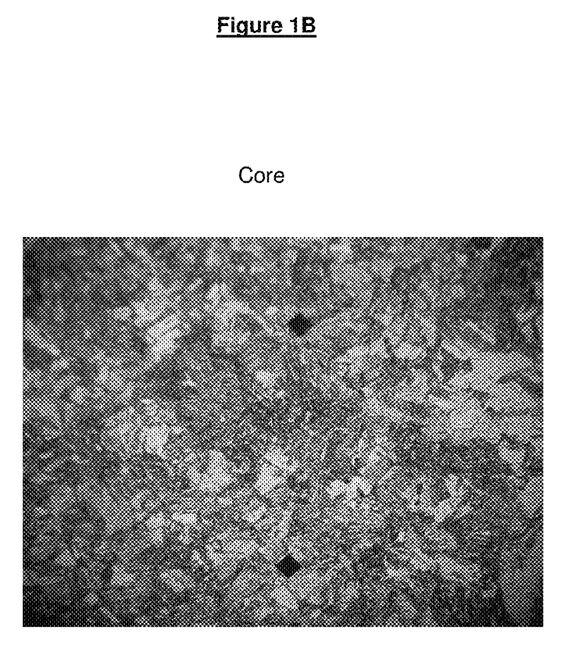
FIG. 1B is a micrograph showing the nitrided core of a nitrogen alloyed 422 martensitic stainless steel prepared according to example 1.

FIG. 1B shows a micrograph of the core of the same sample after nitriding according to the procedure set forth herein.

Figure 2:
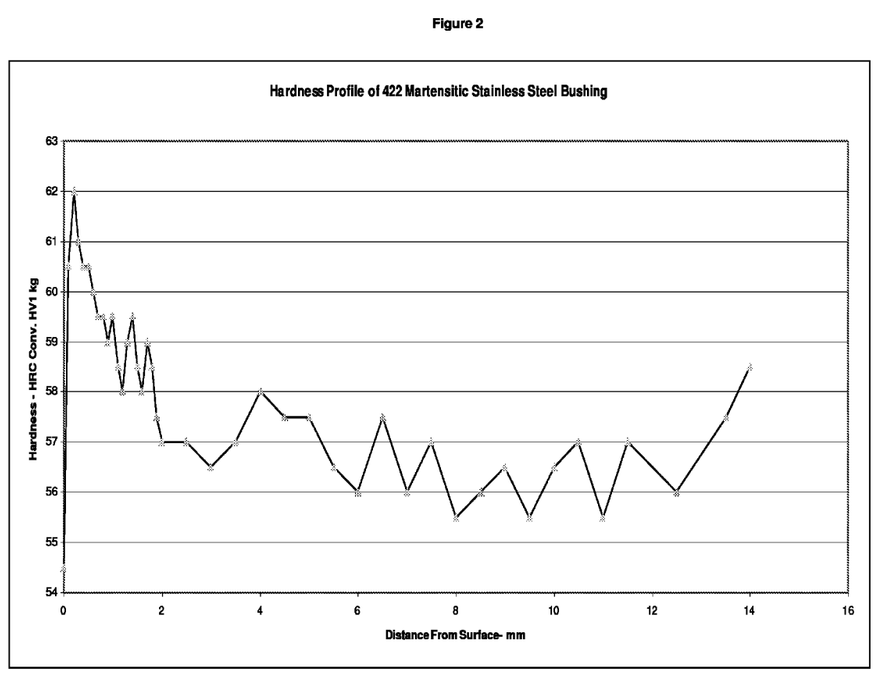
FIG. 2 is a graphic plot showing the surface hardness profiles of a nitrogen alloyed 422 martensitic stainless steel bushing prepared according to example 1.

If additional depth of hardness to resist wear is a further asset, there is the capability of through hardening a ⅝ inch cross section. A minimum through hardness of 55 HRC is obtainable in ten (10) hours, and a through harden to 60 HRC minimum can be achieved in 10 hours. Therefore, not only does the process of the present invention produce a nitrided surface, but if the stainless steel component is subjected to extreme degrees of wear, corrosion and/or stress, whereby through hardening is needed, the present process can through harden a ⅝ inch cross section. The results of the evaluation are included within Table I which is shown graphically as FIG. 2.

TABLE I

Hardness of Nitrided 422 Stainless Steel Resulting From 2000° F. Cycle

| Distance from Surface-mm | Hardness-HRC |
|---|---|
| 0 | 54.5 |
| 0.1 | 60.5 |
| 0.2 | 62 |
| 0.3 | 61 |
| 0.4 | 60.5 |
| 0.5 | 60.5 |
| 0.6 | 60 |
| 0.7 | 59.5 |
| 0.8 | 59.5 |
| 0.9 | 59 |
| 1.0 | 59.5 |
| 1.1 | 58.5 |
| 1.2 | 58 |
| 1.3 | 59 |
| 1.4 | 59.5 |
| 1.5 | 58.5 |
| 1.6 | 58 |
| 1.7 | 59 |
| 1.8 | 58.5 |
| 1.9 | 57.5 |
| 2.0 | 57 |
| 2.5 | 57 |
| 3.0 | 56.5 |
| 3.5 | 57 |
| 4.0 | 58 |
| 4.5 | 57.5 |
| 5.0 | 57.5 |
| 5.5 | 56.5 |
| 6.0 | 56 |
| 6.5 | 57.5 |
| 7.0 | 56 |
| 7.5 | 57 |
| 8.0 | 55.5 |
| 8.5 | 56 |
| 9.0 | 56.5 |
| 9.5 | 55.5 |
| 10.0 | 56.5 |
| 10.5 | 57 |
| 11.0 | 55.5 |
| 11.5 | 57 |
| 12.5 | 56 |
| 13.5 | 57.5 |
| 14.0 | 58.5 |
| Inside Diameter | 54 |

As can be seen from the data presented, the surface was nitrided to a hardness greater than 58 HRC for a depth of 1.9 millimeters and the core hardness was >55 HRC throughout the thickness. The nitrogen content was 0.14 m/o after nitriding, but the core contained only 0.02 m/o nitrogen. Therefore, the nitriding cycle that used a higher temperature of 2000° F. was successful in through hardening the ⅝ inch cross section to >55 HRC. The increase in temperature provides a new avenue for through hardening rather than surface hardening 422 bushings.

Example 2

Piston rods machined from martensitic stainless steel (422 XD and 440 C stainless steel rods) were surface nitrided to a hardness of 60 HRC which continued to a depth of 0.030 inches (1 mm). Each of the piston rods was provided the same nitriding and stabilization treatment. However, the 422 XD piston rods were tempered at 950° F. (510° C.), whereas the 440 C piston rods were tempered at 200° F. (95° C.) to a specific hardness.

The 440 C and the 422 XD stainless steel piston rods were through hardened to a hardness of 60 HRC. Therefore, it is evident that the time required to nitride a sample of stainless steel using the process of the present invention is considerably shorter if a tougher core is required. The 422 XD piston rod did not achieve quite as high a through hardness as the 440 C piston rod, and the microstructure consisted of fine nitrides, whereas the 440 C microstructure contained blocky, larger nitrides. For these reasons, the 422 XD alloy is preferred. Parts immersed for 200-hour in a salt solution exhibited minimal corrosion.

The 422 XD and the 440 A stainless steel through-hardened piston rods were tested under service conditions to determine whether they are sufficiently tough for the application. If the toughness is not sufficient, the nitriding cycle can be reduced to a fraction of the time, resulting in substantial savings in heat-treating cost while still maintaining a hard, wear resistant surface. On the other hand, the 440 C and the 422 XD martensitic stainless steels did accept the nitrogen in solid solution, and upon stabilization and tempering, formed hard, wear-resistant nitride particles thereby hardening the alloy. However, the time was too long to simply harden the surface, but through hardened the piston rod to a hardness of 60 HRC. If a surface hardness of 60 HRC to a depth of 0.030 inch (1 mm) is required, then the cycle for nitriding needs to be reduced significantly in time. Shorter time at temperature should reduce the cost of heat treatment dramatically. The 422 XD alloy is slightly lower in through hardness than the 440 C, and the microstructure contains fine nitrides rather than the blocky larger nitrides present in the 440 C.

Piston rods were immersed a 5 m/o salt solution for 200 hours and then weighed to determine the amount of metal lost through corrosion. In the case of the 440 C stainless steel piston rod, the weight was unchanged at all. In the case of the 422 XD alloy bar stock, the weight loss was 0.019 grams. Therefore, both stainless steels exhibited excellent corrosion resistance in a marine environment.

Example 3

Spray paint pumps distribute sprayed paint under an atomizing pressure of 3,000 psi. One of the main constituents of the pump is the piston rod. In practice, the piston rod is protected from erosion by seals that prevent hard abrasive particles comprising the pigments from abrading the piston rod. However, when sustaining service, the seals begin to leak and thereby permit pigment to abrade the piston rod. Therefore the piston rod requires some degree of surface protection against abrasion, while not compromising the corrosion resistance of the piston rod. The material of choice is a 440 C martensitic stainless steel. When tempered, this steel has strength, ductility and toughness. The process of the present invention was utilized to provide hardness and wear resistance to the 440 C stainless steel alloy.

Three piston rods were placed in a vacuum furnace and hung vertically in the middle from wires so that all surfaces were available for the deposition of gaseous nitrogen on the surface of the piston rods. The furnace was evacuated and 50 scfh. hydrogen was introduced to the furnace. At a temperature of 1000° F. (540° C.) the hydrogen was removed from the furnace and nitrogen at 630 torr was introduced. The temperature was elevated to 1900° F. (1040° C.) and maintained for a total of eight hours. The piston rods were then quenched at a nitrogen pressure of 10 barr.

The three piston rods were transferred to a nitrogen bath where they were stabilized in a liquid nitrogen temperature of −300° F. (−184° C.) for 30 minutes. The three 440 C piston rods were transferred to an air furnace and tempered at 400° F. (204° C.) in air for one hour.

To determine the hardness and depth of hardness from the surface, the piston rods were sectioned to obtain small segments of cross section at the reduced end, one inch from the reduced end, one inch from the threaded end and from the threaded end. These sections were mounted in Lucite, ground and polished. The polished cross sections were placed on the stage of a Leco micro-hardness tester in sequence. Prior to placement, a standard hardness specimen was evaluated and the hardness measurements were found to be precise within ±0.5 HRC. Micro-hardness measurements of each cross-section were then made at the surface at 0.1 mm increments internally to the core.

After the hardness was determined, the 440 C martensitic stainless steel cross sections were etched with Vilella's reagent to reveal their microstructure. Remaining cross sections of the 440 C martensitic stainless steel piston rods were immersed in a 5% saline solution. After immersion for 200 hours their weight loss or weight gain was measured to determine the extent of corrosion that resulted from the heat treatment.

Figure 3:
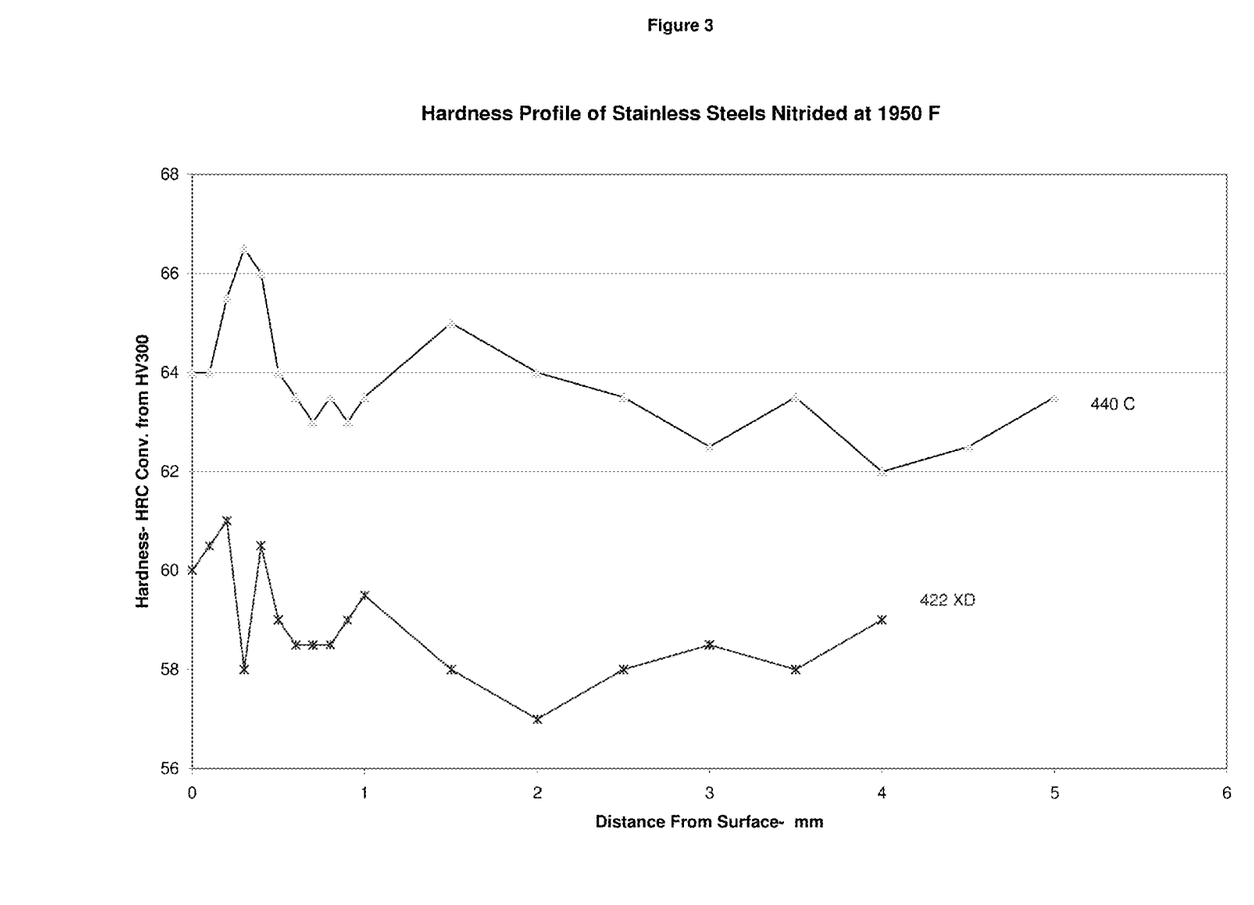
FIG. 3 is a graphic plot showing the surface hardness profiles of two nitrogen alloyed martensitic stainless (422 XD and 440 C) steels prepared according to example 1.

Sectioned piston rods of 440 C martensitic steel compositions were nitrided to a depth of 5 mm from the surface. Hardness measurements are included as Table 4 and two samples are shown graphically in FIG. 3. The piston rods were sectioned to obtain measurements from four critical areas. The measurements were made from the surface to a depth of 5 mm from the surface. The surface hardness of each section was found to be greater than a hardness of 58 HRC in each of the sections that were measured, as shown in Table 4. The core hardness that was measured was 44 HRC.

TABLE 4

Nitriding of 440A Stainless Steel Rods

| Distance from Surface-mm | Short End | 1" From Short End | 1" From Threaded End | Threaded End |
|---|---|---|---|---|
| Surface | 59 | 62.5 | 60 | 58.5 |
| 0.1 | 60.5 | 63 | 58.5 | 56 |
| 0.2 | 60 | 63.5 | 57.5 | 57 |
| 0.3 | 63 | 64.5 | 57.5 | 59 |
| 0.4 | 61.5 | 63.5 | 59 | 59 |
| 0.5 | 61.5 | 64 | 58 | 59 |
| 0.6 | 61.5 | 61.5 | 58 | 60 |
| 0.7 | 61 | 62.5 | 60.5 | 60 |
| 0.8 | 61.5 | 64 | 59.5 | 63 |
| 0.9 | 60.5 | 63.5 | 58.5 | 61 |
| 1.0 | 60.5 | 64 | 59 | 63 |
| 1.1 | 60.5 | 63 | | |
| 1.2 | 60 | 62.5 | | |
| 1.3 | 59.5 | 62 | | |
| 1.4 | | 62.5 | | |
| 1.5 | | 61 | 60 | 60 |
| 1.6 | | 63.5 | | |
| 1.7 | | 62.5 | | |
| 1.8 | | 61 | | |
| 1.9 | | 61.5 | | |
| 2.0 | | 62 | 61 | 58.5 |
| 2.5 | | 62 | 62 | 58.5 |
| 3.0 | | 62.5 | 61.5 | 61.5 |
| 3.5 | | 63 | 60.5 (ID) | 55 (ID) |
| 4.0 | | 63 | | |
| 4.5 | | 63 | | |
| 5.0 | | 63.5 | | |
| core | 58.5 | 63 | | |

It is clearly evident from the numerical data and the graphical representation thereof that hardness is directly a function of the degree of nitrogen diffusion into the steel and increases with increased nitrogen content in the steel. Moreover, it is evident that nitrogen alloyed martensitic steel produced according to the process of the present invention exhibits vastly superior qualities to that of ordinary martensitic steel and although the materials discussed in this invention are limited to 422 and 430 A martensitic stainless steel alloys, the limitation is not meant to exclude other alloys that contain significant concentrations of carbide or nitrogen formers. This group of alloys include austenitic and duplex stainless steels, tool steels and low alloy steels. Either carburizing or nitriding successfully applies a surface of desired depth of hardness in less than half the time of commercial processes practiced today, in a clean environment for the workers, and without discharge of toxic gases to the atmosphere.

What I claim is:

1. A process for nitriding martensitic stainless steels comprising:
   a. heating martensitic stainless steels to a temperature of from about 900° F. (480° C.) to about 2500° F. (1370° C.) in a vacuum furnace in the presence of hydrogen or argon gas in order to clean the surface thereof;
   b. subsequently removing the hydrogen or argon gas from said furnace;
   c. injecting nitrogen ($N_2$) gas, ammonia gas ($NH_3$) or mixtures thereof as a pulsed injection into the chamber of said furnace which is at a partial atmospheric pressure of from about 500 torr to about 700 torr;
   d. nitrating said steel at a temperature of from about 1400° F. (760° C.) to about 2200° F. (1205° C.);
   e. quenching said steel, and,
   f. raising the temperature of the chamber in said furnace a second time from about 900° F. (480° C.) to about 2500° F. (1370° C.) prior to cooling the final product.

2. The process as recited in claim 1 wherein said martensitic stainless steel is further stabilized in a nitrogen bath at sub-zero temperatures to insure any remaining austenite is transformed into un-tempered martensite.

3. The process as recited in claim 2 wherein said steel is nitrided on its surface.

4. The process as recited in claim 3 wherein said steel is through hardened by increasing the heating period.

5. The process as recited in claim 4 further comprising an additional carburization step of the stainless steel surface through the secondary application of heat in combination with acetylene or methylene gas.

6. The process of claim 5 wherein said nitrogen alloyed steel is maintained in a vacuum furnace in the presence of hydrogen or argon gas in order to clean the surface thereof.

7. The process of claim 6 further comprising a second nitriding step after the stainless steel is cooled to ambient temperature consisting of:
   a) increasing the furnace temperature to 1470° F. (800° C.) and the furnace pressure to 15,000 psi;
   b) adding argon or hydrogen gas for a time sufficient to clean the surface of said stainless steel;
   c) removing the hydrogen or argon gas from the furnace;
   d) introducing nitrogen or ammonia gas at various partial pressures;
   e) maintaining said increased temperature, and
   f) quenching and cooling the stainless steel.

8. The process as recited in claim 7 wherein said steel is hardened throughout.

9. The process as recited in claim 8 wherein said steel is further hardened on its surface.

10. The process as recited in claim 7 wherein prior to cooling the final product the temperature is raised to from about 900° F. (480° C.) to about 2500° F. (1370° C.).

11. The process as recited in claim 10 wherein said nitrogen or ammonia gas is injected into said furnace through a pulsed injection to maintain the desired partial pressure.

12. The process as recited in claim 11 wherein acetylene is introduced along with said nitrogen.

\* \* \* \* \*